United States Patent
Lee et al.

(10) Patent No.: US 9,812,701 B2
(45) Date of Patent: Nov. 7, 2017

(54) RECHARGEABLE LITHIUM BATTERY

(71) Applicant: SAMSUNG SDI CO., LTD., Yongin-si, Gyeonggi-do (KR)

(72) Inventors: Jin-Hyon Lee, Yongin-si (KR);
Sang-In Park, Yongin-si (KR);
Ji-Woon Lee, Yongin-si (KR);
Eun-Young Goh, Yongin-si (KR);
Jong-Ki Lee, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 201 days.

(21) Appl. No.: 14/751,824

(22) Filed: Jun. 26, 2015

(65) Prior Publication Data
US 2015/0380721 A1    Dec. 31, 2015

(30) Foreign Application Priority Data

Jun. 30, 2014   (KR) .................. 10-2014-0081292
Jun. 22, 2015   (KR) .................. 10-2015-0088435

(51) Int. Cl.
*H01M 4/13*   (2010.01)
*H01M 10/052*   (2010.01)
*H01M 4/02*   (2006.01)

(52) U.S. Cl.
CPC ............ *H01M 4/13* (2013.01); *H01M 10/052* (2013.01); *H01M 2004/021* (2013.01)

(58) Field of Classification Search
CPC . H01M 10/052; H01M 2004/021; H01M 4/13
See application file for complete search history.

(56) References Cited

U.S. PATENT DOCUMENTS

| | | | | |
|---|---|---|---|---|
| 6,001,139 A | * | 12/1999 | Asanuma ................ | H01M 4/13 29/623.3 |
| 7,740,985 B2 | * | 6/2010 | Howard .................. | A61N 1/08 429/163 |
| 2008/0020279 A1 | * | 1/2008 | Schmidt ................ | H01M 4/131 429/221 |

FOREIGN PATENT DOCUMENTS

| | | |
|---|---|---|
| JP | 09-199180 | 7/1997 |
| JP | 2000-182671 | 6/2000 |

(Continued)

OTHER PUBLICATIONS

Yangxing Li et al., Effective enhancement of lithium-ion battery performance using SLMP, Electrochemistry Communications, 13 (2011, 664-667).

*Primary Examiner* — Carlos Barcena
(74) *Attorney, Agent, or Firm* — Lee & Morse P.C.

(57) ABSTRACT

A rechargeable lithium battery includes a separator between a positive electrode and a negative electrode. The positive electrode has a positive electrode coating region and a positive electrode uncoated region. A positive active material is coated to a positive electrode current collector in the positive electrode coating region, and the positive active material is not coated in the positive electrode uncoated region. The negative electrode includes a negative electrode coating region and a negative uncoated region. A negative active material is coated to a negative electrode current collector in the negative electrode coating region, and the negative active material is not coated and a lithium source is in the negative uncoated region. The negative electrode coating region includes an active region corresponding to the positive electrode coating region. The lithium source is at the negative electrode and separated from an end of the active region by a predetermined interval.

20 Claims, 10 Drawing Sheets

(56) References Cited

FOREIGN PATENT DOCUMENTS

KR  10-2004-0029965       *  7/2006  ............ H01M 10/12
KR  10-2014-0032577  A      3/2014

* cited by examiner

RECHARGEABLE LITHIUM BATTERY

CROSS-REFERENCE TO RELATED APPLICATION

Korean Patent Application No. 10-2014-0081292, filed on Jun. 30, 2014, and Korean Patent Application No. 10-2015-0088435, filed on Jun. 22, 2015, are incorporated by reference herein in their entirety.

BACKGROUND

1. Field

One or more embodiments herein relate to a rechargeable lithium battery.

2. Description of the Related Art

A rechargeable lithium battery is used to power many types of electronic devices because of its performance characteristics. For example, a rechargeable lithium battery may have a discharge voltage (and thus an energy density) greater than other batteries, e.g., ones using an aqueous alkaline solution.

Structurally, a rechargeable lithium battery may have a separator between positive and negative electrodes and an electrolyte. The electrodes include a current collector and an active material layer. The positive electrode may be made from oxides of lithium and transition metal having a structure into which lithium ions are capable of intercalating. Examples include $LiCoO_2$, $LiMn_2O_4$, $LiNi_{1-x}Co_xO_2$ ($0<x<1$).

The negative electrode may be made from carbon-based materials, e.g., artificial graphite, natural graphite, or hard carbon capable of intercalating and deintercalating lithium ions However, because a carbon-based negative active material causes non-reversible capacity, lithium corresponding to the non-reversible capacity of the negative electrode is insufficient in the positive electrode. As a result, the potential (Li/Li+) of the positive electrode may increase to deteriorate the lifecycle of the battery.

This effect may occur because the initial discharge of an initial charge of the negative electrode is not good, e.g., initial discharge efficiency is not good. Moreover, generation of a non-reversible capacity of the negative electrode and deterioration of discharge efficiency may intensify for greater thicknesses of the active material layer and when there is a high active mass.

Various methods haven been proposed in an attempt to increase the initial discharge efficiency of the negative electrode. One method involves pressurizing and transferring a stabilized lithium metal powder or a lithium metal carrier film prepared by coating the stabilized lithium metal powder on a releasing film.

SUMMARY

In accordance with one or more embodiments, a rechargeable lithium battery includes a positive electrode including a positive electrode coating region and a positive electrode uncoated region, wherein a positive active material is coated to a positive electrode current collector in the positive electrode coating region, and the positive active material is not coated in the positive electrode uncoated region; a negative electrode including a negative electrode coating region and a negative uncoated region, wherein a negative active material is coated to a negative electrode current collector in the negative electrode coating region and the negative active material is not coated and a lithium source is in the negative uncoated region: a separator between the positive electrode and the negative electrode; and an electrolyte, wherein the negative electrode coating region includes an active region corresponding to the positive electrode coating region, and wherein the lithium source is at the negative electrode and separated from an end of the active region by a predetermined interval.

The lithium source may be separated from the end of the active region by an interval of about 0.1 mm or more. The lithium source may separated from the end of the active region by an interval of about 0.1 mm to 10 cm. The lithium source may separated from the negative uncoated region at the end of the active region.

The active region may be at multiple surfaces of the negative electrode current collector, and the lithium source may be at multiple surfaces of the negative uncoated region. The active region may be at multiple ends of the negative electrode current collector, and the lithium source may be separated from the negative uncoated region at multiple ends of the negative electrode current collector by the interval.

The negative electrode coating region may include a non-active region connected to the active region and may correspond to an outside of the positive electrode coating region. The non-active region may be at multiple surfaces of the negative electrode current collector, and the lithium source may be connected to the non-active region and is at multiple surfaces of the negative uncoated region. The non-active region may be at both surfaces of the negative electrode current collector, and the lithium source may be connected to the non-active region and is at one surface of the negative uncoated region. The non-active region may be at multiple surfaces of the negative electrode current collector, and the lithium source may be separated from at least one surface of the non-active region by the interval.

In accordance with one or more other embodiments, a negative electrode includes an uncoated region; and a coating region including an active region corresponding to a positive electrode coating region and a negative active material coated to a negative electrode current collector, wherein the negative active material is not coated in the uncoated region, a lithium source corresponds to the negative uncoated region, and the lithium source is spaced from the active region by a predetermined interval. The lithium source may be spaced from the active region by about 0.1 mm to 10 cm. The lithium source may be spaced from the uncoated region at an end of the active region.

The active region may be at multiple surfaces of the negative electrode current collector, and the lithium source may be at multiple surfaces of the uncoated region. The active region may be at multiple ends of the negative electrode current collector, and the lithium source may be spaced from the uncoated region at multiple ends of the negative electrode current collector.

The coating region may include a non-active region connected to the active region and may correspond to an outside of a positive electrode coating region. The non-active region may be at multiple surfaces of the negative electrode current collector, and the lithium source may be connected to the non-active region and is at multiple surfaces of the uncoated region. The non-active region may be at both surfaces of the negative electrode current collector, and the lithium source may be connected to the non-active region and is at one surface of the uncoated region. The non-active region may be at multiple surfaces of the negative electrode current collector, and the lithium source may be spaced from at least one surface of the non-active region.

In accordance with one or more other embodiments, a rechargeable lithium battery includes a positive electrode and a negative electrode in accordance with any of the embodiments disclosed herein.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present.

Figure 1:
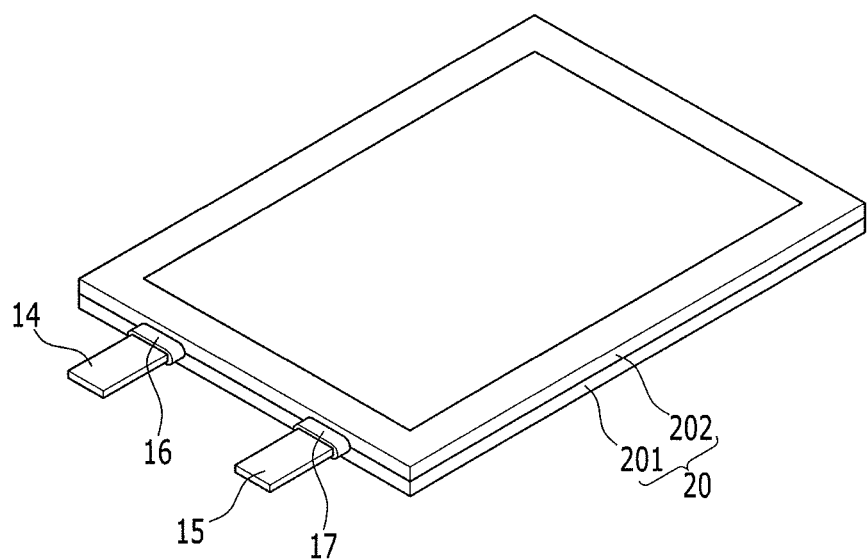
FIG. 1 illustrates an embodiment of a rechargeable lithium battery.
Figure 2:
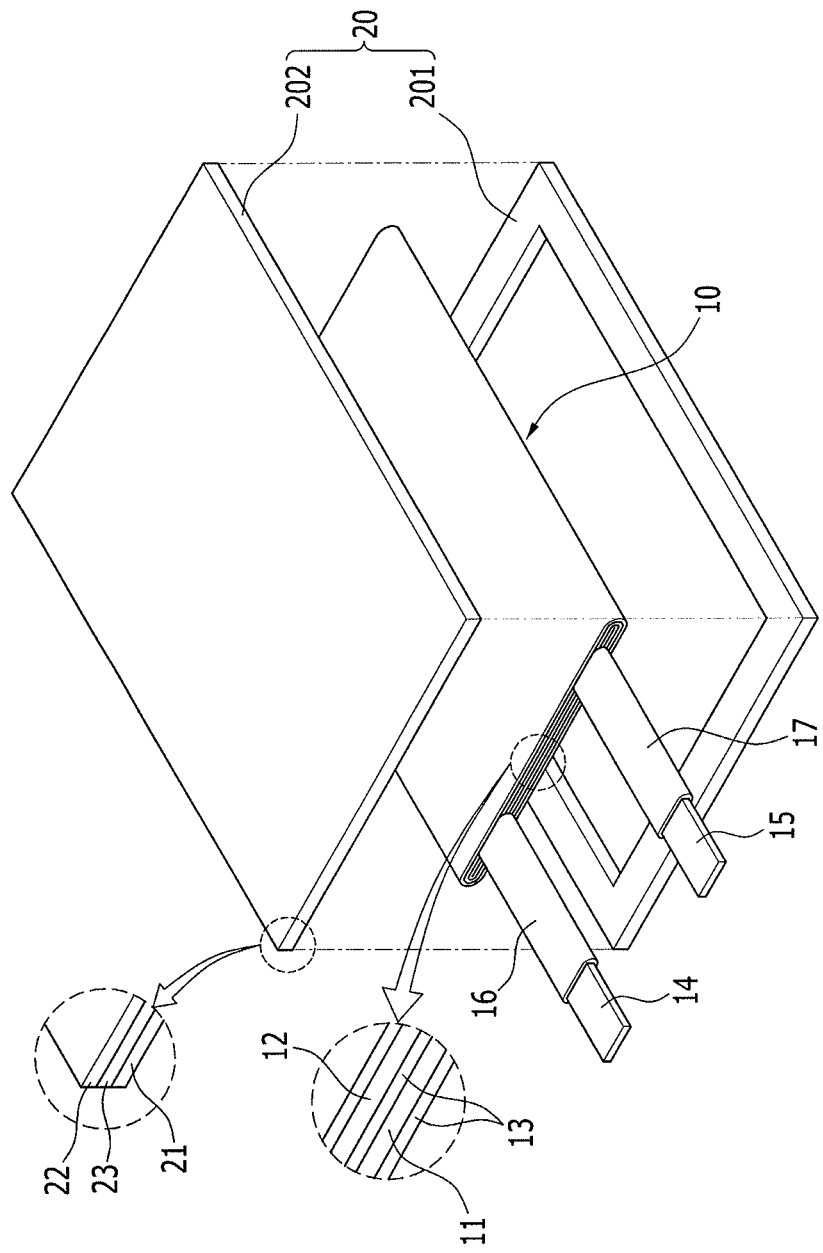
FIG. 2 illustrates an embodiment of an electrode assembly and a pouch of the rechargeable lithium battery.

FIG. 1 illustrates an embodiment of a rechargeable lithium battery, and FIG. 2 illustrates an exploded perspective view of an embodiment of an electrode assembly and a pouch of the rechargeable lithium battery.

Referring to FIGS. 1 and 2, the rechargeable battery includes a pouch 20 containing an electrode assembly 10. The electrode assembly 10 is formed with a predetermined (e.g., jelly roll) shape and thin thickness, for example, by disposing and spiral-winding a first electrode (e.g., positive electrode) 11 and a second electrode (e.g., negative electrode) 12 several times with a separator 13 therebetween. The separator 13 functions to pass lithium ions and may be made, for example, of polyethylene, polypropylene, polyvinylidene fluoride or may be formed as a multilayer of two or more thereof. In one embodiment, the separator 13 may be a mixed multilayer separator, e.g., polyethylene/polypropylene two-layer separator, a polyethylene/polypropylene/polyethylene three-layer separator, or a polypropylene/polyethylene/polypropylene three-layer separator.

The electrode assembly 10 may further include a first lead tab (e.g., a positive electrode lead tab) 14 and a second lead tab (e.g., negative electrode lead tab) 15 respectively connected to the positive and negative electrodes 11 and 12.

Figure 3:
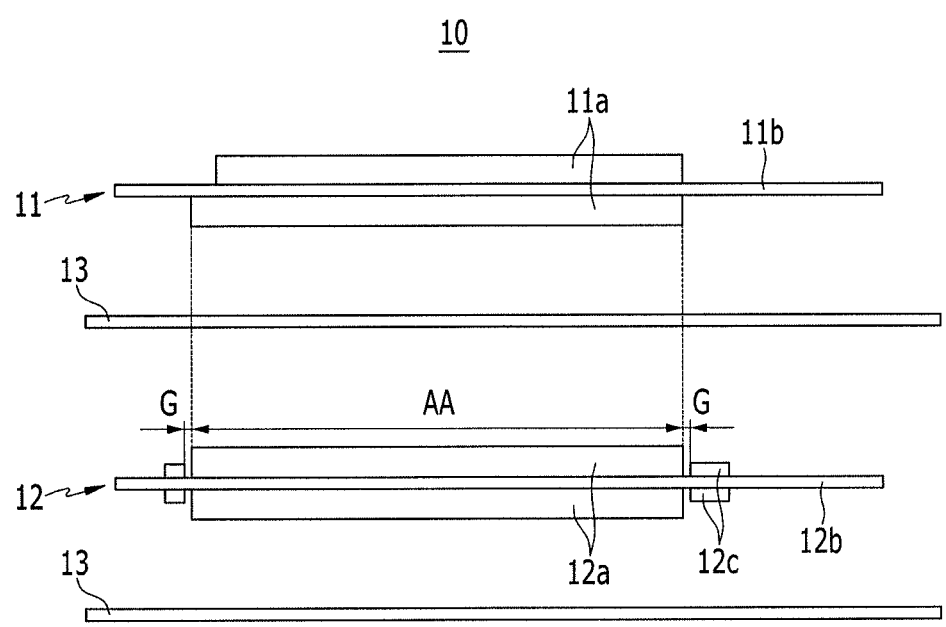
FIG. 3 illustrates an embodiment of a negative electrode and a positive electrode of the electrode assembly.

FIG. 3 illustrates an exploded cross-sectional view of one embodiment of a negative electrode and a positive electrode of the electrode assembly in FIG. 2. The positive electrode 11 includes a positive electrode coating region 11a in which a positive active material is coated to a positive electrode current collector, and a positive electrode uncoated region 11b set as a positive electrode current collector that is not coated with the positive active material and is exposed. The current collector of the positive electrode 11 may be Al or another conductive material.

The positive active material may be a compound (e.g., a lithiated intercalation compound) that is reversibly intercalating and deintercalating. Examples include at least one among a composite oxide of a metal of cobalt, manganese, nickel, or combinations thereof, and lithium. The representative examples may be compounds represented by one of the chemical formulas:

$Li_aAl_{1-b}X_bD_2$ ($0.90 \leq a \leq 1.8$, $0 \leq b \leq 0.5$); $Li_aAl_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0 \leq b \leq 0.5$, $0 \leq c \leq 0.05$); $Li_aNi_{1-b-c}Co_bX_cD_\alpha$ ($0/90 \leq a \leq 1.8$, $0 \leq b \leq 0.5$, $0 \leq c \leq 0.5$, $0 < \alpha \leq 2$); $Li_aNi_{1-b-c}Co_bX_cO_{2-\alpha}T_\alpha$ ($0/90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bC_{oc}Mn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $LiaNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $Li_aFePO_4$ ($0.90 \leq a \leq 1.8$).

In above chemical formulas, A is selected from a group including Ni, Co, Mn, and combinations thereof, X is selected from a group including Al, Ni, Co, Mn, Cr, Fe, Mg, Sr, V, rare earth elements, and combinations thereof, D is selected from a group including O, F, S, P, and combinations thereof, E is selected from a group including Co, Mn, and combinations thereof, T is selected from a group including F, S, P, and combinations thereof, G is selected from a group including Al, Cr, Mn, Fe, Mg, La, Ce, Sr, V, and combinations thereof, Q is selected from a group including Ti, Mo, Mn, and combinations thereof, Z is selected from a group including Cr, V, Fe, Sc, Y, and combinations thereof, and J is selected from a group including V, Cr, Mn, Co, Ni, Cu, and combinations thereof.

Also, the compound with a coating layer on the surface of the compound may be used, or a mixture of the compound without coating layer and the compound with the coating layer may be used. The coating layer may include at least one coating element compound selected from a group including an oxide, hydroxide, oxy-hydroxide, oxy-carbonate, and hydroxy carbonate of the coating element. The compound forming the coating layer may be amorphous or crystalline. The coating element in the coating layer may be Mg, Al, Co, K, Na, Ca, Si, Ti, V, Sn, Ge, Ga, B, As, Zr, or mixtures thereof. The coating layer formation process may use any coating method using these elements in a compound that does not adversely affect the physical properties of the positive active material. e.g., spray coating, dipping.

In the positive active material layer, the amount of the positive active material may be, for example, 90 wt % to 98 wt % of an entire weight of the positive active material layer. The positive active material layer includes a binder and a conductive material. In this case, an amount of the binder and the conductive material may be 1 wt % to 5 wt % of the entire weight of the positive active material layer, respectively. One or more of the aforementioned weight percentages may be different in another embodiment.

The binder has a function of easily adhering the positive active material particles to each other and easily adhering the positive active material to the current collector. Representative examples include polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin, and nylon.

The conductive material provides conductivity to the electrode and may be any electron conductive material that does not cause a chemical change in the battery. Examples include a carbon-based material such as natural graphite, artificial graphite, carbon black, acetylene black, ketjen black, and carbon fiber, a metal-based material such as a metal powder of copper, nickel, aluminum, silver, etc. or metal fiber, conductive polymers such as a polyphenylene derivative, or a mixture of conductive materials.

The negative electrode 12 includes a negative electrode coating region 12a in which the negative active material is coated to the negative electrode current collector, and a negative uncoated region 12b set as the negative electrode current collector that is not coated with the negative active material and is exposed. The current collector of the negative electrode 12 may be at least one of a copper foil, a nickel foil, a stainless steel foil, a titanium foil, a nickel foam, a copper foam, a polymer substrate coated with a conductive metal, or a combination thereof.

The negative active material includes a material capable of reversibly intercalating and deintercalating lithium ions, a lithium metal, an alloy of the lithium metal, a material doping or dedoping lithium, or a transition metal oxide. A carbon-based material capable of reversibly intercalating and deintercalating lithium ions may be used. Representative examples include crystalline carbon, amorphous carbon, or a combination thereof may be used. An example of crystalline carbon may be graphite such as non-shape, plate-shaped, flake, circular, or fiber-like natural or artificial graphite, and an example of the amorphous carbon may be a soft carbon, a hard carbon, a mesophase pitch-based carbide, calcined coke, or a combination thereof.

The alloy of the lithium metal may be an alloy of lithium and one metal selected from a group including Na, K, Rb, Cs, Fr, Be, Mg, Ca, Sr, Si, Sb, Pb, In, Zn, Ba, Ra, Ge, Al, and Sn.

Examples of the material for doping and de-doping the lithium include Si, $SiO_x$ ($0<x<2$), a Si-Q alloy (Q is an alkali metal, an alkali earth metal, a group 13 element, a group 14 element, a transition metal, a rare earth element, or a combination thereof, and is not Si), a Si—C composite, or a Si-based compound of a combination thereof; Sn, $SnO_2$, Sn—R (R is an alkali metal, an alkali earth metal, a group 13 element, a group 14 element, a transition metal, a rare earth element, or a combination thereof, and is not Sn), or a Sn-based compound of a combination thereof; or a combination thereof, may be used, or a mixture at least one thereof and $SiO_2$ may be used. Examples of the element Q and R include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Examples of the transition metal oxide include a vanadium oxide, a lithium vanadium oxide, or a titanium oxide.

In the negative active material layer, the amount of the negative active material may be 95 wt % to 99 wt % of the entire weight of the negative active material layer. The negative active material layer may also include a binder and may further selectively include a conductive material. In the negative active material layer, the amount of the binder may be 1 wt % to 5 wt % of the entire weight of the negative active material layer. Also, when further including the conductive material, the negative active material may be 90 wt % to 98 wt %, the binder may be 1 wt % to 5 wt %, and the conductive material may be 1 wt % to 5 wt %. One or more different weight percentages may be used in another embodiment.

The binder serves to bind negative active material particles to each other well, and bind a negative active material to a current collector well. The binder may be, for example, a non-aqueous binder, an aqueous binder, or combinations thereof.

Examples of a non-aqueous binder include polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, polyamide-imide, polyimide, or a combination thereof.

The aqueous binder may be a binder using water as a solvent or a distributed medium. The aqueous binder may use water as the solvent or the distributed medium such that an organic solvent having toxicity such as N-methylpyrrolidone may be omitted. Accordingly, the active material composition including the aqueous binder is harmless to the human body and is environmentally friendly.

Examples of the aqueous binder may be a rubber-based binder or a polymer resin binder. The rubber-based binder may be selected from a group including styrene-butadiene rubber, acrylated styrene-butadiene rubber (SBR), acrylonitrile-butadiene rubber, acrylic rubber, butyl rubber, fluorine rubber, and combinations thereof. The polymer resin binder may be selected from polytetrafluoroethylene, polyethylene, polypropylene, an ethylene propylene copolymer, polyethylene oxide, polyvinylpyrrolidone, polyepichlorohydrin, polyphosphazene, polyacrylonitrile, polystyrene, an ethylene-propylene-diene copolymer, polyvinyl pyridine, chlorosulfonated polyethylene, latex, polyester resin, acrylic resin, phenol resin, epoxy resin, polyvinyl alcohol, and combinations thereof.

When the aqueous binder is used as the negative electrode binder, a cellulose-based compound providing viscosity may be included as an agent for increasing viscosity. The cellulous-based compound may be at least one carboxymethyl cellulose, hydroxypropylmethyl cellulose, methyl cellulose, or alkali metal salts thereof. The alkali metal may be Na, K, or Li. The amount of the agent for increasing viscosity may be, for example, 0.1 parts by weight to 3 parts by weight based on 100 parts by weight of the negative active material.

The conductive material is used to give conductivity to the electrodes. Any material that does not cause a chemical change and is an electronically conductive material may be used in batteries. Examples include a carbon-based material, such as natural graphite, artificial graphite, carbon black, acetylene black, ketjen black, or carbon fiber; a metal-based material, such as a metal powder or a metal fiber of copper, nickel, aluminum, silver, or the like; a conductive polymer such as a polyphenylene derivative; or a mixture thereof, may be used.

The positive and negative uncoated regions 11b and 12b may be provided at a front end or end of the length direction of the spiral-wound positive and negative electrodes 11 and 12 when spiral-wounding the positive and negative electrodes 11 and 12 to form the electrode assembly 10. As one example, the positive electrode uncoated region 11b is provided at both spiral-wound ends, and the negative uncoated region 12b is provided at both spiral-wound ends. The positive electrode uncoated region may be provided at the spiral-wound end and the negative uncoated region may be provided at the spiral-wound front end.

Referring again to FIGS. 1 and 2, the positive electrode lead tab 14 is connected to the positive electrode uncoated region 11b. The negative electrode lead tab 15 is separated from the positive electrode lead tab 14 and is connected to the negative uncoated region 12b.

The positive electrode lead tab 14 and the negative electrode lead tab 15 are drawn out and disposed at the same side of the electrode assembly 10. The positive electrode lead tab and the negative electrode lead tab may be respectively disposed at opposite sides of the electrode assembly (e.g., the right side and the left side in FIGS. 1 and 2).

The pouch 20 receives the electrode assembly 10 and a periphery thereof is thermally bonded, thereby forming the rechargeable lithium battery. In this case, the positive electrode lead tab 14 and the negative electrode lead tab 15 are coated with tab insulating members 16 and 17 and are drawn out of the pouch 20 through the bonding portion. Thus, the tab insulating members 16 and 17 electrically insulate the positive and negative electrode lead tabs 14 and 15 from each other and from the pouch 20.

The pouch 20 may be formed of a multi-layered sheet structure enclosing the exterior of the electrode assembly 10. For example, the pouch 20 includes a polymer sheet 21 constituting an inner surface of the pouch 20 and performing insulation and thermal fusion-bonding roles, a polyethylene terephthalate (PET) sheet, a nylon sheet, or a PET-nylon complex sheet 22 (hereinafter, for convenience, a "nylon sheet" is described as an example) forming an outer surface and performing a protection role, and a metal sheet 23 providing mechanical strength. The metal sheet 23 is between the polymer sheet 21 and the nylon sheet 22 and may be, for example, an aluminum sheet.

The pouch 20 includes a first exterior member 201 receiving the electrode assembly 10 and a second exterior member 202 covering the electrode assembly 10 and thermally bonded to the first exterior member 201 outside the electrode assembly 10. The first and second exterior members 201 and 202 may be formed of the polymer sheet 21, the nylon sheet 22, and the metal sheet 23 having the same structure.

For example, the first exterior member 201 is formed of a concave structure to receive the electrode assembly 10. The second exterior member 201 is formed of a plane structure to cover the electrode assembly 10 received by the first exterior member 201. The second exterior member 202 may be connected to the first exterior member 202.

The electrode assembly 10 is substantially formed of a plane plate structure with a cuboidal shape, and the pouch 20 forms the exterior appearance of the plane plate structure with the cuboidal shape. The rechargeable battery encloses the electrode assembly 10 by the pouch 20, thereby entirely forming a plane plate structure of the cuboidal shape.

Referring again to FIG. 3, the negative electrode coating region 12a includes an active region AA corresponding to the positive electrode coating region 11a. Also, the negative electrode 12 may include a lithium source 12c at the negative electrode 12 that does not face the positive electrode coating region 11a. The lithium source 12c is separated from the end of the active region AA by a predetermined interval G and is positioned at the negative electrode 12, e.g., the lithium source 12c faces the positive electrode uncoated region 11b.

The lithium source may be a lithium metal, a lithiated silicon, a lithiated Ge, or a combination thereof. The lithiated metal, as well as the above material as the lithium source, may be also used.

When the lithium source 12c is at the active region AA of the negative electrode coating region 12a facing the positive electrode coating region 11a, the lithium source may be precipitated such that the lithium source 12c is positioned outside the active region AA of the negative electrode 12 which does not face the positive electrode coating region 11a. For example, the lithium source 12c may be provided at the negative electrode 12 that does not face the positive electrode coating region 11a to adhere the lithium source, thereby increasing initial efficiency of the rechargeable lithium battery. Accordingly, the rechargeable lithium battery may achieve an increased capacity and the energy density through an increase of the initial efficiency.

For example, the lithium source 12c may be positioned to be separated from the end of the active region AA by the interval G of 0.1 mm or more. Also, the lithium source 12c may be positioned to be separated from the end of the active region AA by the interval G of 0.1 mm to 10 cm. In the embodiment, the lithium source 12c may be positioned to be separated from the end of the active region AA by the interval G of 2 mm to 10 mm. When the interval is within the above range, the initial charge and discharge characteristics may be more improved.

The lithium source 12c may be positioned to be separated by the interval G from the negative uncoated region 12b at the end of the active region AA. In this case, the lithium source 12c increases the initial efficiency, thereby increasing the capacity and energy density. The interval G prevents the precipitation of the lithium source between the active region AA and the negative uncoated region 12b.

The active region AA may be formed at both surfaces of the negative electrode current collector. In this case, the lithium source 12c may be formed at both surfaces of the negative uncoated region 12b. Thus, the lithium source 12c increases the initial efficiency at both surfaces of the negative uncoated region 12b, and the interval G prevents the extraction of the lithium between the active region AA and the negative uncoated region 12b at both surfaces of the negative uncoated region 12b.

Also, the active region AA may be formed at both surfaces of the negative electrode current collector. In this case, the lithium source 12c may be separated by the interval G from the negative uncoated region 12b at both ends of the negative electrode current collector. In this case, the lithium source 12c increases the initial efficiency at both ends of the negative electrode current collector, and the interval G prevents the extraction of the lithium between the active region AA and the negative uncoated region 12b at both ends of the negative electrode current collector.

The electrolyte may include, for example, a non-aqueous organic solvent and a lithium salt. The non-aqueous organic solvent may serve as a medium through which ions participated in an electrochemical reaction of a battery may be moved.

Examples of the non-aqueous organic solvent include carbonate-based, ester-based, ether-based, ketone-based, alcohol-based, and aprotic solvents.

Examples of the carbonate based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like.

Examples of the ester-based solvent include methyl acetate, ethyl acetate, n-propyl acetate, dimethyl acetate, methyl propionate, ethyl propionate, γ-butyrolactone, decanolide, valerolactone, mevalonolactone, caprolactone, and the like.

Examples of the ether-based solvent include dibutyl ether, tetraglyme, diglyme, dimethoxy ethane, 2-methyl tetrahydrofuran, and tetrahydrofuran.

Examples of the ketone-based solvent include cyclohexanone and the like.

Examples of the alcohol-based solvent include ethyl alcohol, isopropyl alcohol, and the like.

Examples of the aprotic solvent include nitriles including R—CN (R is a C2-C20 straight, branched, or cyclic hydrocarbon group which may include a double bonded aromatic ring or an ether bond), amides including dimethylformamide, dioxolanes including 1,3-dioxolane, sulfolanes, and the like.

The non-aqueous organic solvents may be used alone or in a combination of two or more. When used in combination, the mixing ratio may be appropriately controlled, for example, according to a desired battery performance.

When the carbonate-based solvent is used, a cyclic carbonate and a chained carbonate in a mixture thereof may be used. In this case, the cyclic carbonate and the chained carbonate may be mixed, for example, at a volume ratio of 1:1 to 1:9 to achieve a predetermined performance of the electrolyte.

In one embodiment, the non-aqueous organic solvent may include an aromatic hydrocarbon-based organic solvent in addition to the carbonate-based solvent. The carbonate-based solvent and the aromatic hydrocarbon based organic solvent may be mixed, for example, at a volume ratio of 1:1 to 30:1.

An aromatic hydrocarbon-based compound corresponding to Chemical Formula 1 may be used as the aromatic hydrocarbon-based organic solvent.

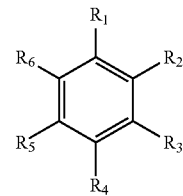

Chemical Formula 1 where R1 to R6 are the same as or different from each other and are selected from a group including hydrogen, a halogen, a C1-C10 alkyl group, a haloalkyl group, or a combination thereof.

The aromatic hydrocarbon-based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodo benzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

The non-aqueous electrolyte may further include vinylene carbonate or an ethylene carbonate-based compound corresponding to Chemical Formula 2 as an additive for improving the lifecycle characteristics of the battery.

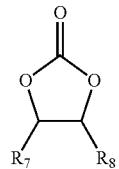

Chemical Formula 2 where R7 and R8 are the same as or different from each other, and are selected from a group including hydrogen, a halogen group, a cyano group (CN), a nitro group ($NO_2$), or a C1 to C5 fluoroalkyl group, and at least one of R7 and R8 is selected from a group including a halogen group, a cyano group (CN), a nitro group ($NO_2$), or a C1 to C5 fluoroalkyl group, however R7 and R8 are not all hydrogen.

Representative examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. When these additives for improving the lifecycle characteristics are used, the use amounts thereof may be appropriately controlled. e.g., correspond to predetermined amounts.

The lithium salt is dissolved in the organic solvent to act as a lithium ion supply source in the battery, thereby enabling a basic operation of a rechargeable lithium battery and promoting the movement of lithium ions between a positive electrode and a negative electrode. Representative examples of the lithium salt include, as a supporting electrolyte salt, at least one selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ where x and y are natural numbers, e.g., an integer of 1 to 20), LiCl, LiI, and LiB $(C_2O_4)_2$ (lithium bis(oxalato) borate: LiBOB). The concentration of the lithium salt may be, for example, about 0.1 M to about 2.0 M. If the concentration of the lithium salt falls within the above range, the electrolyte may have appropriate electrical conductivity and viscosity, so that the performance of the electrolyte may be excellent and the lithium ions may be effectively moved. The concentration of lithium salt may be in a different range in another embodiment.

The rechargeable lithium battery may be classified into a lithium ion battery, a lithium ion polymer battery, and a lithium polymer battery according to a kind of the separator and the electrolyte used in the battery, into a cylindrical shape, a square shape, a coin shape, a pouch shape, and the like according to a shape, and may be divided into a bulk type and a thin film type according to a size.

Figure 4:
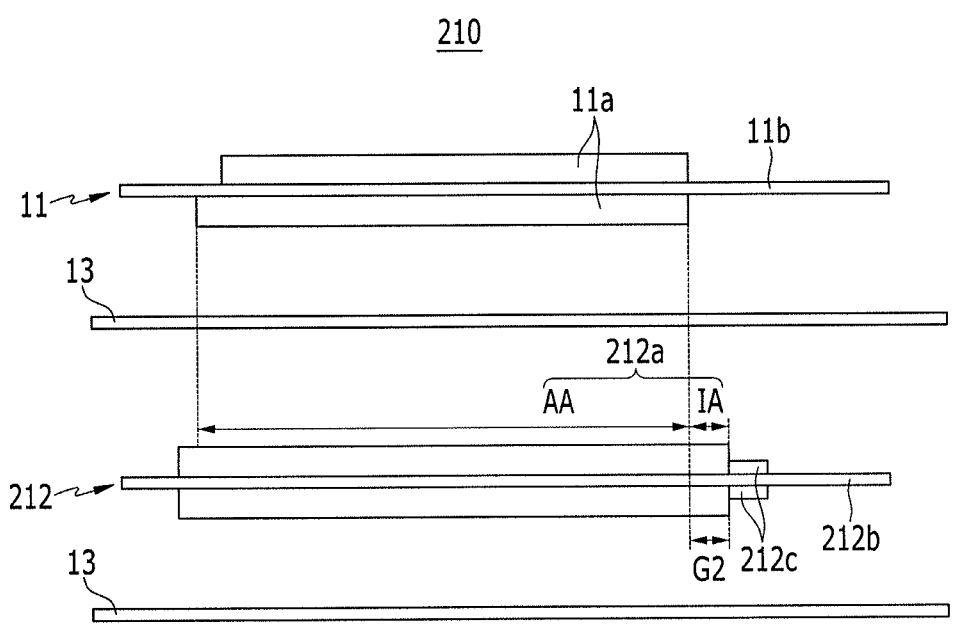
FIG. 4 illustrates another embodiment of a negative electrode and a positive electrode of an electrode assembly.

FIG. 4 illustrates an exploded cross-sectional view of another embodiment of a negative electrode and a positive electrode of an electrode assembly 210 in a rechargeable lithium battery. Referring to FIG. 4, in this embodiment, a negative electrode coating region 212a includes the active region AA and a non-active region IA connected to the active region AA and corresponding to outside the positive electrode coating region 11a.

The active region AA is formed at both surfaces of the negative electrode current collector. The non-active region IA is connected to the active region AA in both surfaces of the negative electrode current collector. The lithium source 212c is connected to the non-active region IA formed at both surfaces of the negative uncoated region 212b.

The predetermined interval G2 from the end of the active region AA is set as a range of the non-active region IA. For example, the lithium source 212c increases the initial efficiency in both surfaces of a negative uncoated region 212b, and the interval G2 prevents the extraction of lithium between the active region AA and the non-active region IA in both surfaces of the negative uncoated region 212b.

In the electrode assembly 210, the lithium source 212c is at both surfaces of the negative uncoated region 212b in one end of the negative electrode current collector. The lithium source may be at both surfaces of the negative uncoated region in one end of the negative electrode current collector.

Figure 5:
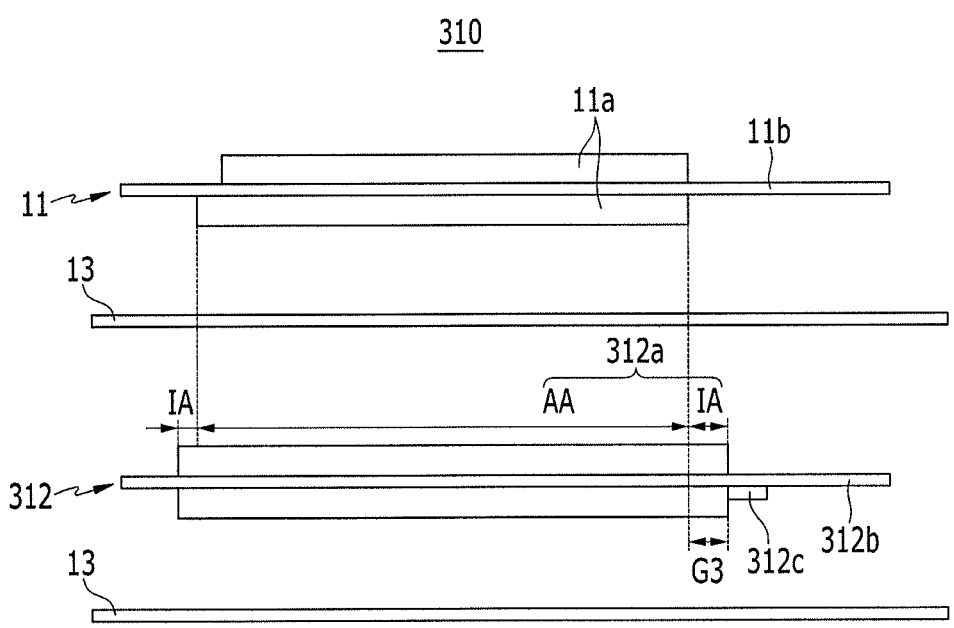
FIG. 5 illustrates another embodiment of a negative electrode and a positive electrode of an electrode assembly.

FIG. 5 illustrates an exploded cross-sectional view of another embodiment of a negative electrode and a positive electrode of an electrode assembly 310 in a rechargeable lithium battery. Referring to FIG. 5, the active region AA of a negative electrode coating region 312a is formed at both surfaces of the negative electrode current collector, and the non-active region IA is formed to be connected to the active region AA in both surfaces of the negative electrode current collector.

A lithium source 212c is connected to the non-active region IA and is formed at one surface of a negative uncoated region 212b. The predetermined interval G3 from the end of the active region AA is set as the range of the non-active region IA. For example, the lithium source 312c increases the initial efficiency at one surface of the negative uncoated region 312b, and the interval G3 prevents the extraction of lithium between the active region AA and the non-active region IA at one surface of the negative uncoated region 312b.

In the electrode assembly 310, the lithium source 312c is formed at the one surface outside the negative uncoated region 312b. The lithium source may be formed at one surface inside the negative uncoated region.

Figure 6:
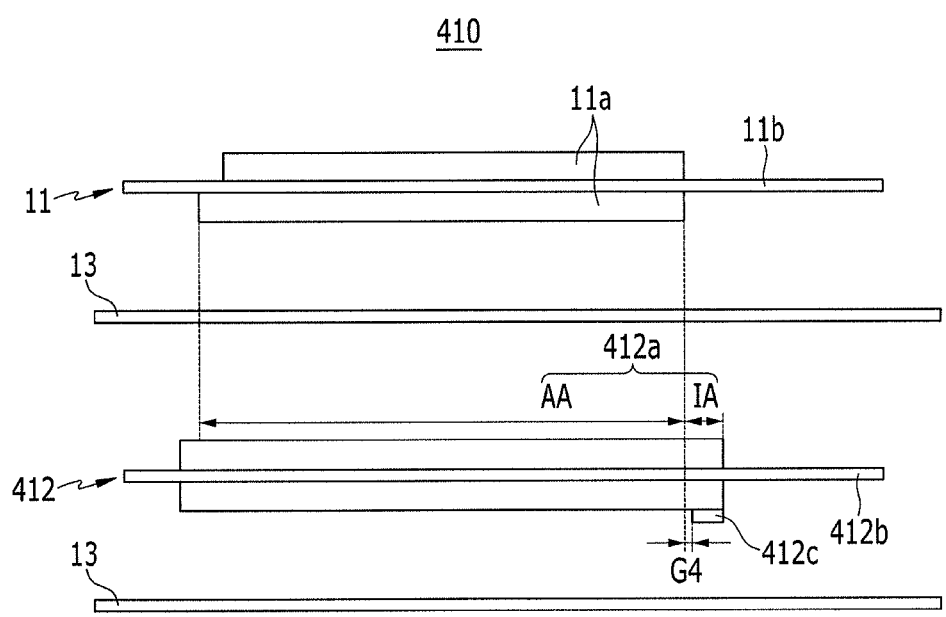
FIG. 6 illustrates another embodiment of a negative electrode and a positive electrode of an electrode assembly.

FIG. 6 illustrates an exploded cross-sectional view of another embodiment of a negative electrode and a positive electrode of an electrode assembly 410 in a rechargeable lithium battery. Referring to FIG. 6, the non-active region IA of a negative electrode coating region 412a is formed at both surfaces of the negative electrode current collector. Accordingly, a negative uncoated region 412b is set outside the non-active region IA.

A lithium source 412c is formed at at least one surface of the non-active region IA and is positioned to be separated from the active region AA by the interval G4. For example, the lithium source 412c increases the initial efficiency at one surface of the non-active region IA, and the interval G4 prevents the extraction of lithium source between the active region AA and the non-active region IA at one surface of the non-active region IA.

In the electrode assembly 410, the lithium source 412c is at both surfaces of the non-active region IA in one end of the negative electrode current collector. The lithium source may be formed at both surfaces of the non-active region in one end of the negative electrode current collector, or at one surface or both surfaces of the non-active region in both ends.

The following Examples and Comparative Examples are provided to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

In this example, 94 wt % of a $LiCoO_2$ positive active material, 3 wt % of a Super P conductive material, and 3 wt % of a polyvinylidene fluoride binder were mixed in an N-methylpyrrolidone solvent to form a positive active material slurry.

The positive active material slurry was coated to an Al-foil current collector except for one end (a portion that is not coated is referred to as an uncoated region) and was dried to form the positive electrode including the positive electrode uncoated region and the positive electrode coating region.

Also, 90 wt % of a graphite negative active material and 10 wt % of a polyvinylidene fluoride binder were mixed in N-methylpyrrolidone to form a negative active material slurry. The negative active material slurry was coated except for one end of the Cu foil current collector (the end that is not coated is referred to as an uncoated region) and was dried to form a negative electrode formed with the negative uncoated region and a negative electrode coating region. The negative electrode coating region included the active region corresponding to the positive electrode coating region and the non-active region corresponding to the uncoated region, in the non-active region, at one surface that was not directly contacted with the separator, the lithium metal foil was adhered with an interval of 3 mm from the end of the active region, thereby forming the negative electrode of the structure in FIG. 6.

Using the positive electrode and the negative electrode, the polyethylene polymer separator was positioned between the positive electrode and the negative electrode, and they were spiral-wound to form the electrode assembly.

Using the electrode assembly and an electrolyte solution of a mixed solvent of ethylene carbonate and ethylmethyl carbonate (1:1 volume ration in which 1 M $LiPF_6$ were dissolved), a rechargeable lithium cell was fabricated.

Example 2

In this example, a rechargeable lithium cell was fabricated by the same procedure as in Example 1, except the lithium metal foil was adhered to one surface that was not in direct contact with the separator, in the non-active region, with an interval of 5 mm from the end of the active region. The negative electrode of the structure in FIG. 6 was thus formed.

Example 3

In this example, a rechargeable lithium cell was fabricated by the same procedure as in Example 1, except that the lithium metal foil was adhered to one surface that was not in direct contact with the separator, in the non-active region, with an interval of 10 mm from the end of the active region. The negative electrode of the structure in FIG. 6 was thus formed.

Comparative Example 1

Figure 7:
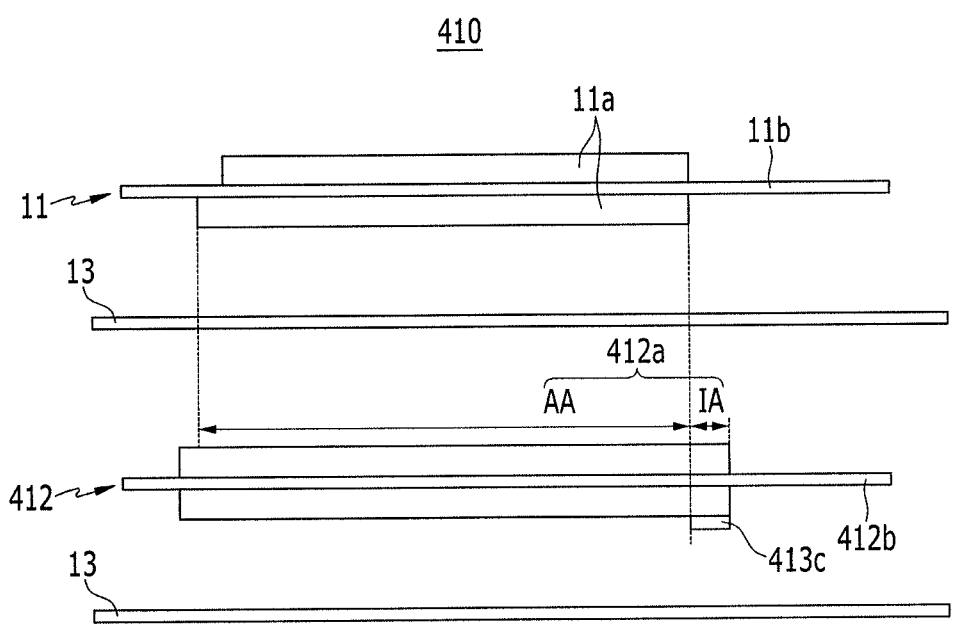
FIG. 7 illustrates a comparative example of a negative electrode and a positive electrode of an electrode assembly in a rechargeable lithium battery.
Figure 8:
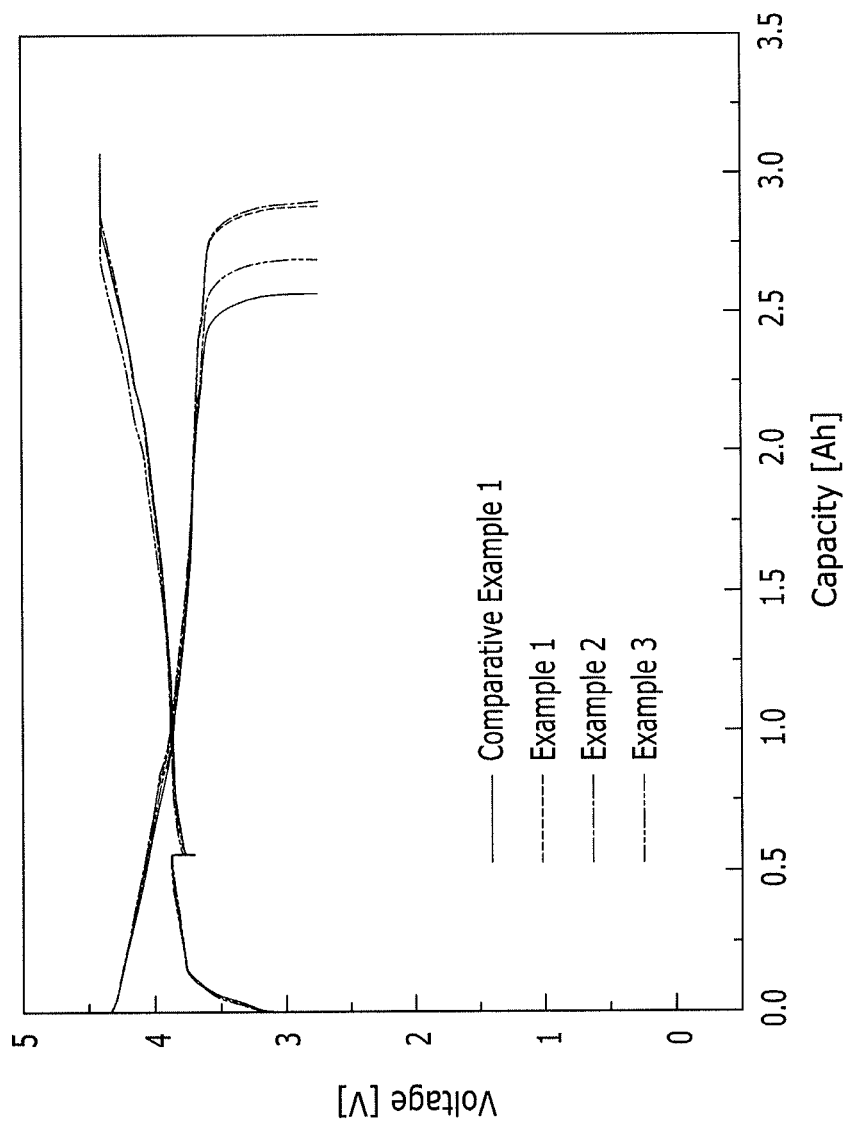
FIG. 8 illustrates examples of initial charge and discharge characteristic results of rechargeable lithium cells.

In this example, the lithium metal foil was adhered to one surface that was not in direct contact with the separator in the non-active region to form the negative electrode of the structure in FIG. 7. That is, the lithium metal foil (413*c* of FIG. 7) was positioned at the entire non-active region without the interval from the end of the active region. The rechargeable lithium cells fabricated according to Examples 1 to 3 and Comparative Example 1 were charged and discharged at a 0.1 C rate, and the initial charge and discharge characteristics were measured. The results are illustrated in FIG. 8. As illustrated in FIG. 8, the initial charge and discharge characteristics of the rechargeable lithium cell of Examples 1 to 3 (in which the lithium metal foil is adhered to the negative electrode with the interval of 3 mm, 5 mm and 10 mm from the end of the active region) was excellent compared with the rechargeable lithium battery of Comparative Example 1.

Figure 9:
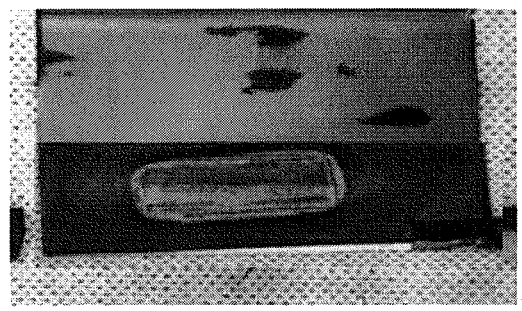
FIG. 9 illustrates an example of a dismantled rechargeable lithium cell after charge and discharge.
Figure 10:
FIG. 10 illustrates another example of a dismantled rechargeable lithium cell after charge and discharge.
Figure 11:
FIG. 11 illustrates an example of a dismantled rechargeable lithium cell after charge and discharge.
Figure 12:
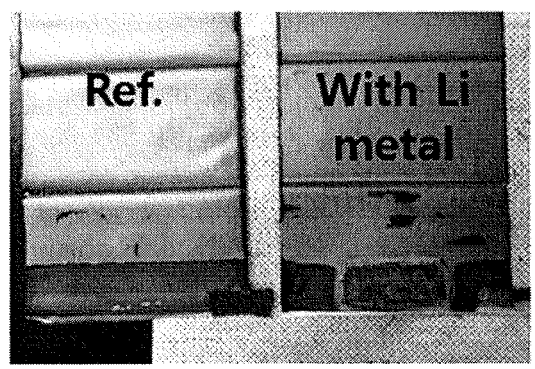
FIG. 12 illustrates a comparative example of a dismantled rechargeable lithium cell after charge and discharge.

FIG. 9 is a photograph illustrating the dismantled rechargeable lithium cell of Example 1 after the charge and discharge. FIG. 10 is a photograph illustrating the dismantled rechargeable lithium cell of Example 2 after the charge and discharge. FIG. 11 is a photograph illustrating the dismantled rechargeable lithium cell of Example 3 after the charge and discharge. FIG. 12 is a photograph illustrating the dismantled rechargeable lithium cell of Comparative Example 1 after the charge and discharge. For comparison, a case (Ref.) in which the lithium metal is omitted is also in FIG. 10.

As illustrated in FIGS. 9 to 11, because the rechargeable lithium cells according to Examples 1 to 3 have a clear surface, it may be confirmed that extraction of the lithium did not occur. In contrast, in the case of Comparative Example 1 (indicated by "With Li metal"), a white powder is illustrated in the surface differently from the Ref. in FIG. 10. Thus, it may be confirmed that lithium extraction occurred.

In accordance with one or more of the aforementioned embodiments, a rechargeable lithium battery includes a positive electrode including a positive electrode coating region in which a positive electrode active material is coated to a positive electrode current collector and a positive electrode uncoated region in which the positive electrode active material is not coated; a negative electrode including a negative electrode coating region in which a negative active material is coated to a negative electrode current collector and a negative uncoated region in which the negative active material is not coated and including a lithium source; a separator positioned between the positive electrode and the negative electrode; and an electrolyte, wherein the negative electrode coating region includes an active region corresponding to the positive electrode coating region, and the lithium source is positioned at the negative electrode to be separated from an end of the active region by a predetermined interval.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A rechargeable lithium battery, comprising:
    a positive electrode including a positive electrode coating region and a positive electrode uncoated region, wherein a positive active material is coated to a positive electrode current collector in the positive electrode coating region, and the positive active material is not coated in the positive electrode uncoated region;
    a negative electrode including a negative electrode coating region and a negative uncoated region, wherein a negative active material is coated to a negative electrode current collector in the negative electrode coating region and the negative active material is not coated and a lithium source is in the negative uncoated region;
    a separator between the positive electrode and the negative electrode; and
    an electrolyte, wherein the negative electrode coating region includes an active region corresponding to the positive electrode coating region, and wherein the lithium source is at the negative electrode and separated from an end of the active region by a predetermined interval being greater than zero.

2. The rechargeable lithium battery as claimed in claim 1, wherein the lithium source is separated from the end of the active region by an interval of about 0.1 mm or more.

3. The rechargeable lithium battery as claimed in claim 1, wherein the lithium source is separated from the end of the active region by an interval of about 0.1 mm to 10 cm.

4. The rechargeable lithium battery as claimed in claim 1, wherein the lithium source is separated from the negative uncoated region at the end of the active region.

5. The rechargeable lithium battery as claimed in claim 4, wherein:
    the active region is at multiple surfaces of the negative electrode current collector, and
    the lithium source is at multiple surfaces of the negative uncoated region.

6. The rechargeable lithium battery as claimed in claim 4, wherein:
the active region is at multiple ends of the negative electrode current collector, and
the lithium source is separated from the negative uncoated region at multiple ends of the negative electrode current collector by the predetermined interval.

7. The rechargeable lithium battery as claimed in claim 1, wherein the negative electrode coating region includes a non-active region connected to the active region and corresponding to an outside of the positive electrode coating region.

8. The rechargeable lithium battery as claimed in claim 7, wherein:
the non-active region is at multiple surfaces of the negative electrode current collector, and
the lithium source is connected to the non-active region and is at multiple surfaces of the negative uncoated region.

9. The rechargeable lithium battery as claimed in claim 7, wherein:
the non-active region is at both surfaces of the negative electrode current collector, and
the lithium source is connected to the non-active region and is at one surface of the negative uncoated region.

10. The rechargeable lithium battery as claimed in claim 7, wherein:
the non-active region is at multiple surfaces of the negative electrode current collector, and
the lithium source is separated from at least one surface of the non-active region by the predetermined interval.

11. A negative electrode, comprising:
an uncoated region; and
a coating region including an active region corresponding to a positive electrode coating region and a negative active material coated to a negative electrode current collector, wherein the negative active material is not coated in the uncoated region, a lithium source corresponds to the uncoated region, and the lithium source is spaced from the active region by a predetermined interval being greater than zero.

12. The negative electrode as claimed in claim 11, wherein the lithium source is spaced from the active region by about 0.1 mm to 10 cm.

13. The negative electrode as claimed in claim 11, wherein the lithium source is spaced from the uncoated region at an end of the active region.

14. The negative electrode as claimed in claim 13, wherein:
the active region is at multiple surfaces of the negative electrode current collector, and
the lithium source is at multiple surfaces of the uncoated region.

15. The negative electrode as claimed in claim 13, wherein:
the active region is at multiple ends of the negative electrode current collector, and
the lithium source is spaced from the uncoated region at multiple ends of the negative electrode current collector.

16. The negative electrode as claimed in claim 11, wherein the coating region includes a non-active region connected to the active region and corresponding to an outside of a positive electrode coating region.

17. The negative electrode as claimed in claim 16, wherein:
the non-active region is at multiple surfaces of the negative electrode current collector, and
the lithium source is connected to the non-active region and is at multiple surfaces of the uncoated region.

18. The negative electrode as claimed in claim 16, wherein:
the non-active region is at both surfaces of the negative electrode current collector, and
the lithium source is connected to the non-active region and is at one surface of the uncoated region.

19. The negative electrode as claimed in claim 16, wherein:
the non-active region is at multiple surfaces of the negative electrode current collector, and
the lithium source is spaced from at least one surface of the non-active region.

20. A rechargeable lithium battery, comprising:
a positive electrode including a positive electrode coating region; and
a negative electrode including:
an uncoated region; and
a coating region including an active region corresponding to the positive electrode coating region and a negative active material coated to a negative electrode current collector, wherein:
the negative active material is not coated in the uncoated region,
a lithium source corresponds to the negative uncoated region, and
the lithium source is spaced from the active region by a predetermined interval being greater than zero.

* * * * *